No. 692,348.  
Patented Feb. 4, 1902.
E. B. W. REICHEL.
SYSTEM OF ELECTRICAL DISTRIBUTION.
(Application filed Oct. 2, 1899.)
(No Model.)
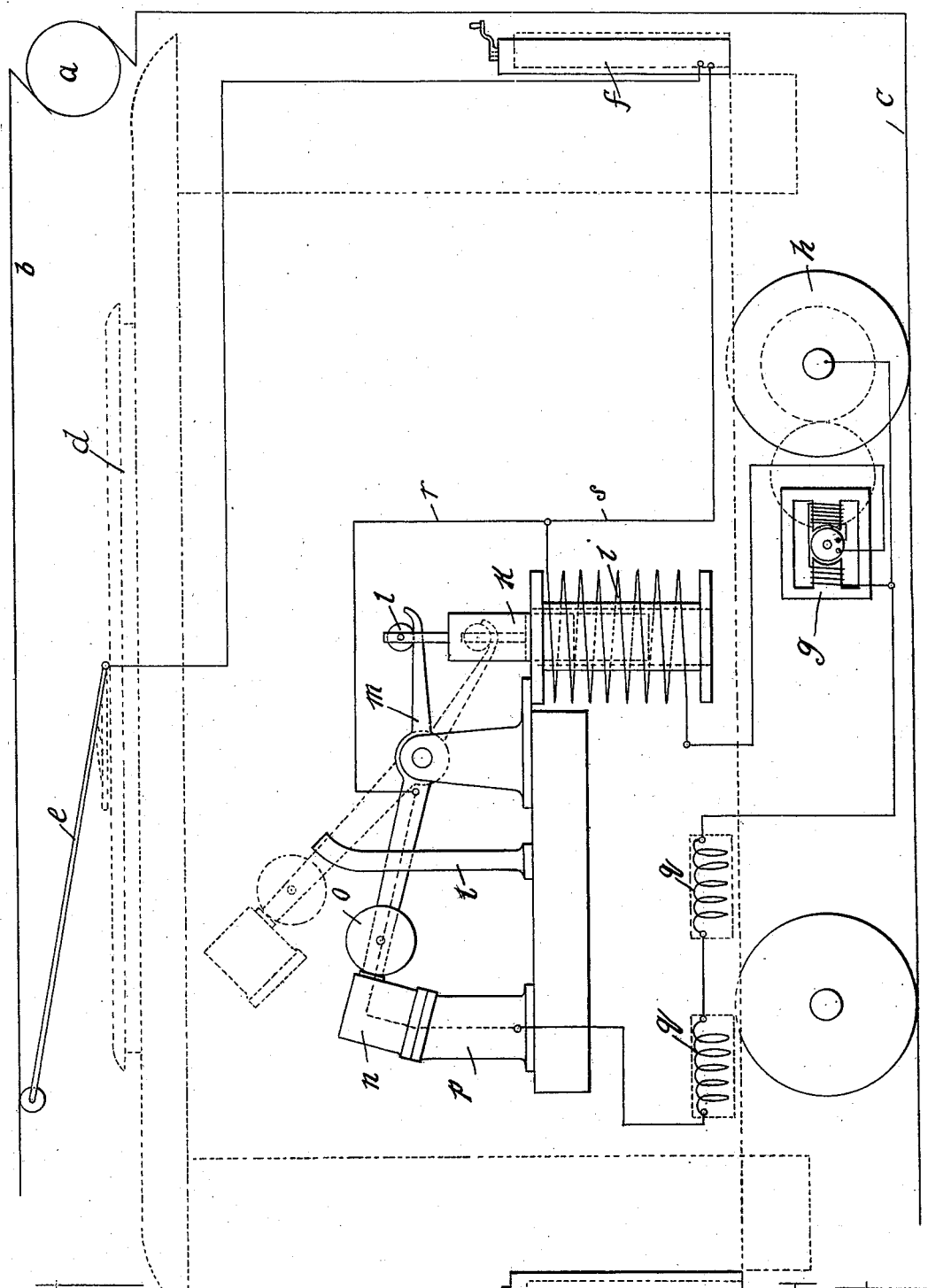
Witnesses  
Inventor  
Emil Berthold Walter Reichel  
By Charles A. Brown & Cragg  
Attorneys

UNITED STATES PATENT OFFICE.

EMIL BERTHOLD WALTER REICHEL, OF STEGLITZ, GERMANY, ASSIGNOR TO THE SIEMENS & HALSKE ELECTRIC COMPANY OF AMERICA, OF CHICAGO, ILLINOIS, A CORPORATION OF ILLINOIS.

SYSTEM OF ELECTRICAL DISTRIBUTION.

SPECIFICATION forming part of Letters Patent No. 692,348, dated February 4, 1902.

Application filed October 2, 1899. Serial No. 732,335. (No model.)

*To all whom it may concern:*

Be it known that I, EMIL BERTHOLD WALTER REICHEL, a subject of the German Emperor, residing at Steglitz, near Berlin, Germany, have invented a certain new and useful Improvement in Systems of Electrical Distribution, (Case No. 242,) of which the following is a full, clear, concise, and exact description, reference being had to the accompanying drawings, forming a part of this specification.

My invention relates to systems of electrical distribution in which the load may vary within wide limits, and has for its object the provision of means for preventing the translating devices from all being supplied with current at the same time when the output of the generator is required for the operation of certain of the translating devices.

My invention is of particular utility in connection with those systems wherein translating means is employed requiring current of widely-varying values in connection with other translating means requiring current of substantially uniform value, which latter translating means is by means of the invention thrown out of circuit when the aforesaid translating means receives or should receive the supply of current that would not be received thereby if the latter translating means were at the same time in circuit.

It will be apparent to those skilled in the art that a variety of apparatus and arrangements of circuits might be devised for securing this control of translating devices, and while I have herein shown and will describe a precise embodiment of the invention I wish it to be understood that I do not limit myself to the precise system shown, except in certain of the claims.

I will explain one embodiment of my invention which I preferably employ in practice in connection with the accompanying drawing, illustrating an electric motor-car with apparatus of my invention carried thereby.

The invention is not to be limited to its use in connection with electric-railway systems, as it is capable of having a number of other important applications.

I have shown a generator of electricity $a$ having one of its terminals connected with a trolley-conductor $b$ and the other with electrically-continuous rails $c$, upon which the car $d$ is adapted to travel. A trolley $e$ is adapted to make contact with the trolley-conductor and to convey current to the controller $f$, which regulates the supply of current through the operating-motor $g$ of the car, current through the motor finding circuit back to the generator by way of the wheels $h$ of the car and the track $c$. I include in this instance the coil of a solenoid $i$ in the conductor leading from the controller to the motor. The core $k$ of the solenoid supports a roller $l$, adapted to ride upon one end of an intermediately-pivoted arm $m$. The other end of this arm supports a contact $n$ and an adjustable weight $o$, which is provided for the purpose of counterbalancing the core of the solenoid. The contact part $n$ is adapted to make connection with a terminal contact $p$, in this instance constituting the terminal of a pair of heating-coils $q\ q$, provided for the purpose of heating the car. The other terminal of the heating-coils is grounded or connected with the tracks through the agency of the car-wheels and is thereby connected with one terminal of the generator $a$. The other terminal of the generator is connected with the translating devices when the parts $n$ and $p$ are in contact through the agency of the conductor $r$, connecting the contact $n$ with the conductor $s$, leading to the solenoid and motor. In the particular instance shown the translating means $q$ is included in a circuit parallel to that including the solenoid or operating magnet $i$ and the operating-motor $g$.

The current supplied to the motor must vary within wide limits, and in accordance with the invention when the motor is supplied with current above a given value the helix of the operating-magnet $i$ is energized, the core $k$ is attracted, and the contact parts $n$ and $p$ separated, so that all of the current will be supplied to the motor. This operation of the apparatus may occur, for example, when the car is started from a state of rest. After the car has reached a certain speed a less amount of current will flow through the motor and the helix of the operating-magnet, the magnet thereby becoming sufficiently deënergized to permit the weight *o* to withdraw the core of the solenoid, and thereby to effect reëngagement between the parts *n* and *p* to restore the circuit through the translating devices *q*. I provide a stirrup *t*, which limits the descent of the core of the solenoid.

While the operation of the controlling apparatus in the instance shown is effected by a change in the volume of current, it is obvious that the operation might be effected upon a change in the potential of the current. I do not wish to be limited to the parallel arrangement of the conductors, including the motor and the translating devices, nor to the nature of the translating devices.

Having thus particularly described my invention, I claim as new and desire to secure by Letters Patent—

1. In a system of electric traction, the combination with a source of current, of a vehicle, a motor for propelling the same, a heating-winding, a circuit including the motor supplied with current from said source, a manually-operated controller for varying the amount of current supplied to the motor, a second circuit including the heating-winding also supplied with current from said source, and means responsive to a predetermined increase of current through the motor for depriving the heating-winding of current, and for giving said winding current upon a decrease of current through the motor, substantially as described.

2. In a system of electric traction, the combination with a source of current, of a vehicle, a motor for propelling the same, a heating-winding, a circuit including the motor supplied with current from said source, a manually-operated controller for varying the amount of current supplied to the motor, a second circuit including the heating-winding also supplied with current from said source, means responsive to a predetermined increase of current through the motor for depriving the heating-winding of current, and for giving said winding current upon a decrease of current through the motor, and a trolley carried by the vehicle for engaging a conductor leading from the source of electricity and supplying current to the motor.

3. In a system of electric traction, the combination with a source of current, of a vehicle, a motor for propelling the same, a heating-winding, a circuit including the motor supplied with current from said source, a controller for varying the amount of current supplied to the motor, a second circuit including the heating-winding also supplied with current from said source, and means responsive to a predetermined increase of current through the motor for depriving the heating-winding of current, and for giving said winding current upon a decrease of current through the motor, substantially as described.

4. In a system of electric traction, the combination with a source of current, of a vehicle, a motor for propelling the same, a heating-winding, a circuit including the motor supplied with current from said source, a controller for varying the amount of current supplied to the motor, a second circuit including the heating-winding also supplied with current from said source, means responsive to a predetermined increase of current through the motor for depriving the heating-winding of current, and for giving said winding current upon a decrease of current through the motor, and a trolley carried by the vehicle for engaging a conductor leading from the source of electricity and supplying current to the motor.

In witness whereof I hereunto subscribe my name this 15th day of August, A. D. 1899.

EMIL BERTHOLD WALTER REICHEL.

Witnesses:
WILLIAM MAYNER,
HENRY HASPER.